US010146594B2

(12) United States Patent
Chao et al.

(10) Patent No.: US 10,146,594 B2
(45) Date of Patent: Dec. 4, 2018

(54) FACILITATION OF LIVE VIRTUAL MACHINE MIGRATION

(71) Applicant: International Business Machines Corporation, Armonk, NY (US)

(72) Inventors: Chih-Wen Chao, Taipei (TW); Cheng-Ta Lee, Taipei (TW); Wei-Shiau Suen, Taichung (TW); Ming Hsun Wu, Taipei (TW); Lun Pin Yuan, State College, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/976,430

(22) Filed: Dec. 21, 2015

(65) Prior Publication Data
US 2016/0188378 A1    Jun. 30, 2016

(30) Foreign Application Priority Data
Dec. 31, 2014   (TW) .............................. 103146660 A

(51) Int. Cl.
*G06F 9/46*  (2006.01)
*G06F 9/455*  (2018.01)
*G06F 9/50*  (2006.01)

(52) U.S. Cl.
CPC ........ *G06F 9/5088* (2013.01); *G06F 9/45558* (2013.01); *G06F 9/505* (2013.01); *G06F 2009/4557* (2013.01)

(58) Field of Classification Search
None
See application file for complete search history.

(56) References Cited

U.S. PATENT DOCUMENTS 7,480,940 B1 * 1/2009 Agbabian ........... H04L 63/1425
                                                      726/22
7,643,482 B2   1/2010 Droux et al.
(Continued)

FOREIGN PATENT DOCUMENTS

CN        103065086       4/2013
WO        20120152153     11/2012

OTHER PUBLICATIONS

Sapuntzakis et al., "Virtual Appliances in the Collective: A Road to Hassle-Free Computing", Aug. 26, 2003.*
(Continued)

*Primary Examiner* — Bradley A Teets
(74) *Attorney, Agent, or Firm* — Lieberman & Brandsdorfer, LLC

(57) ABSTRACT

Embodiment pertain to facilitation of live migration of a virtual machine in a network system. The network system includes a first host, a second host, a first appliance for providing service to the first host, a second appliance for providing service to the second host, and a third appliance. At least one virtual machine is disposed on the first host and has an ongoing first network flow. The first appliance has generated state information about the first network flow. During the migration of the at least one virtual machine to the second host, the third appliance obtains a copy of the state information about the first network flow; and the third appliance takes over from the first appliance to serve the first network flow during the migration of the at least one virtual machine, until the first network flow is terminated.

14 Claims, 3 Drawing Sheets

(56) References Cited

U.S. PATENT DOCUMENTS

| | | | |
|---|---|---|---|
| 7,827,272 B2 | 11/2010 | Poletto et al. | |
| 8,429,362 B1* | 4/2013 | Natanzon | G06F 11/1471 |
| | | | 711/161 |
| 8,775,625 B2 | 7/2014 | Narayanaswamy et al. | |
| 2006/0075191 A1* | 4/2006 | Lolayekar | G06F 3/0613 |
| | | | 711/114 |
| 2009/0073895 A1* | 3/2009 | Morgan | H04L 63/0227 |
| | | | 370/255 |
| 2009/0198817 A1 | 8/2009 | Sundaram et al. | |
| 2009/0249332 A1* | 10/2009 | Hoehle | G06F 9/45558 |
| | | | 718/1 |
| 2010/0269171 A1 | 10/2010 | Raz et al. | |
| 2011/0072138 A1* | 3/2011 | Canturk | G06F 9/5011 |
| | | | 709/226 |
| 2011/0145380 A1* | 6/2011 | Glikson | G06F 9/4856 |
| | | | 709/223 |
| 2012/0072588 A1* | 3/2012 | Kamath | G06F 9/505 |
| | | | 709/224 |
| 2012/0185856 A1 | 7/2012 | Ashihara et al. | |
| 2013/0227685 A1 | 8/2013 | McGee | |
| 2013/0275592 A1 | 10/2013 | Xu et al. | |
| 2013/0305311 A1 | 11/2013 | Puttaswamy et al. | |
| 2013/0332983 A1 | 12/2013 | Koorevaar et al. | |
| 2014/0075433 A1* | 3/2014 | Kotton | G06F 9/45558 |
| | | | 718/1 |
| 2014/0101656 A1 | 4/2014 | Zhu et al. | |
| 2014/0115578 A1 | 4/2014 | Cooper et al. | |
| 2014/0208049 A1* | 7/2014 | Furusawa | G06F 3/0647 |
| | | | 711/162 |
| 2014/0215172 A1* | 7/2014 | Tsirkin | G06F 11/203 |
| | | | 711/162 |
| 2015/0067112 A1* | 3/2015 | Gokhale | H04L 41/0809 |
| | | | 709/220 |
| 2015/0089331 A1* | 3/2015 | Skerry | H04L 43/0823 |
| | | | 714/799 |
| 2015/0195104 A1* | 7/2015 | Okuno | H04L 69/08 |
| | | | 370/392 |
| 2015/0205688 A1* | 7/2015 | Haid | G06F 11/2097 |
| | | | 709/212 |
| 2015/0339164 A1* | 11/2015 | Muthiah | G06F 9/5011 |
| | | | 718/104 |
| 2016/0139948 A1* | 5/2016 | Beveridge | G06F 9/45558 |
| | | | 718/1 |
| 2016/0188353 A1* | 6/2016 | Shu | G06F 9/45533 |
| | | | 718/1 |

OTHER PUBLICATIONS

Keller et al., Live Migration of an Entire Network (and its Hosts), May 2012, pp. 1-14.

Hemchand et al., Security in Live Virtual Machine Migration, Dec. 2011.

Kalim et al., Seamless Migration of Virtual Machines Across Networks, International Conference on Computer Communications and Networks (ICCCN), Nassau, Bahamas, Jul.-Aug. 2013.

Clark et al., Live Migration of Virtual Machines, NSDI '05: 2nd Symposium on Networked Systems Design & Implementation, pp. 273-286.

VMware, Virtual Appliances: A New Paradigm for Software Delivery, 2008.

Open Networking Foundation, OpenFlow Switch Specification, Version 1.4.0, 2013.

* cited by examiner

FACILITATION OF LIVE VIRTUAL MACHINE MIGRATION

This application is based on and claims the benefit of priority from Taiwan Patent Application 103146660, filed on Dec. 31, 2014, now pending, which is hereby incorporated by reference.

BACKGROUND

The embodiments generally relates to live migration of a virtual machine, and more particularly, to the arrangement and management of appliances providing services to the virtual machine during the migration of the virtual machine.

DESCRIPTION OF THE PRIOR ART

In data centers, a virtual machine on one host is commonly required to be migrated to another host for load balancing or host maintenance. In order not to interrupt the operation of the virtual machine (or to reduce the downtime to minimum), the adopted approach is called "live migration". The publication "Live migration of virtual machines" by Clark, Christopher, et al. on Proceedings of the 2nd conference on Symposium on Networked Systems Design may serve as reference. In addition, vMotion of VMware Company or Hyper-V live migration of Microsoft Company may also serve as references.

On the other hand, in data centers, an appliance (which may be a physical appliance or a virtual appliance) is commonly disposed for each host to provide service to the host and the virtual machine thereon. More particularly, in order to prevent network attacks, the use of security appliances (such as firewalls and intrusion detection and prevention devices) to protect hosts and virtual machines is an essential requirement.

To ensure that services provided to the virtual machine do not have interruptions or errors during the migration among different hosts, many approaches have been proposed in the prior arts such as US Pub. 2013/0275592, U.S. Pat. No. 8,775,625, and US Pub. 2014/0101656. The publication "SECURITY IN LIVE VIRTUAL MACHINE MIGRATION" by Shah Payal Hemchand may also serve as reference.

SUMMARY OF THE INVENTION

In one aspect, the present embodiments provide a method of facilitating live migration of a virtual machine in a network system. More particularly, to ensure that services (such as intrusion detection and prevention, firewalls, and load balancing) provided to the virtual machine do not have interruptions or errors during the migration of the virtual machine among different hosts, it is recognized that a new method is required for the arrangement and management of appliances providing services to the virtual machine.

In prior art, the appliance may be disposed in front of each host or directly disposed on each host as a virtual appliance. Regardless of the approach, in general, the appliance only provides service to the corresponding host and the virtual machine thereon; therefore, when the virtual machine is migrated from one host to another host, additional appliances are required for takeover to provide service. However, for certain services (especially services related to network security), the takeover of appliances to provide services is a technical challenge.

For example, to provide correct services, the appliance may have to collect the operation history and context information of the virtual machine and analyze them. Taking the intrusion prevention systems (IPS) as an example, the state information about the external network flow of the virtual machine is required to be collected. During the migration of the virtual machine, the replacing appliance does not have the historical information of the virtual machine, and thus may result in interruptions or errors in the service.

For instance, before migration, a virtual machine may have established a TCP/IP connection with another virtual machine on the same host, and the appliance for the host may acquire the connection record and state information to analyze and determine that the connection between the two virtual machines is an internal connection. However, when the virtual machine is migrated to a new host, the connection with another virtual machine on the original host is still maintained, yet the appliance of the new host will not be aware that such a connection is actually an internal connection, and may result in errors when determining or counting specific security events. It is evident that such an issue shall be more problematic during live migration.

Although prior art such as US Pub. 2014/0101656 provides a synchronization approach for session information of two appliances, the various services, especially services related to network security, provided by the appliances require more information than session information (such as a connection table for intelligent analysis) to operate properly. Unlike simple session information, a lot of information involves more network entities and different network levels, and if the synchronization or sharing of such information between two appliances is to be carried out without causing errors in intelligent analyses by the appliances, the process shall be inconceivably complicated, not to mention the situation in live migration (which involves frequent exchange and synchronization of information between two appliances); therefore, such an approach is not feasible in practice.

Accordingly, the present embodiments provide disposal of a temporary appliance between the appliance providing service to the original host and the appliance providing service to the migration destination host. The temporary appliance may be a physical appliance or a virtual appliance.

According to one embodiment, a virtual machine operates on an original host before migration, and an appliance providing service to the original host correspondingly generates or collects related history and context information according to the operation of the virtual machine. During the live migration of the virtual machine (i.e., when the virtual machine still has ongoing operations), the history and context information generated by the present operations of the virtual machine are cloned to the temporary appliance. Subsequently, the temporary appliance immediately takes over from the appliance providing service to the original host to continue to provide service to the present operations of the virtual machine until the present operations terminate. Following this termination, the temporary appliance may be removed or provided to other applications.

Operations of the virtual machine generated after migration to the destination host, i.e., new operations other than the ongoing operations of the virtual machine on the original host, are provided with service from the appliance providing service to the destination host. By such an allocation, services without interruptions may be provided to the virtual machine. More importantly, the complicated issue involving the aforementioned information synchronization between the appliance providing service to the original host and the appliance providing service to the migration destination host may be avoided.

In addition, in the situation that the appliance providing service to the original host is a virtual appliance and is disposed on the original host along with the virtual machine, the approach provided in the present embodiment(s) is more advantageous. More particularly, after the virtual machine has completed migration, the original host along with the virtual appliance thereon may be turned off together (such as for maintenance) or provided to other applications (such as load balancing), and resources are not required to be preserved for the migrated virtual machine. If the temporary appliance also exists in the resource pool of the data center as a virtual appliance, the appliance providing service to the original host may be deemed as being cloned and migrated from the original host to the resource pool to act as the temporary appliance. For resource pools, vSphere Resource Pools of VMware Company may serve as reference.

In one embodiment, a method of facilitating live migration of a virtual machine in a network system is disclosed. The network system includes a first host, a second host, a first appliance providing service to the first host, a second appliance providing service to the second host, and a third appliance. At least one virtual machine is disposed on the first host and has a first network flow that is ongoing. The first appliance generates state information about the first network flow. During the migration of the at least one virtual machine to the second host, the method controls the third appliance to obtain a copy of the state information about the first network flow, and controls the third appliance to take over from the first appliance to provide service to the first network flow during the migration of the at least one virtual machine until the first network flow terminates.

In other embodiments, a management controller executing the above method and a network system including the management controller are also disclosed. In still another embodiment, a network controller used in the network system is also disclosed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment. Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all of the embodiments.

The following description, the appended claims, and the embodiments of the present invention further illustrate the features and advantages.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only typical embodiments and are not therefore to be considered to be limiting of its scope, the embodiments will be described and explained with additional specificity and detail through the use of the accompanying drawings.

DETAILED DESCRIPTION OF THE EMBODIMENTS

Figure 1:
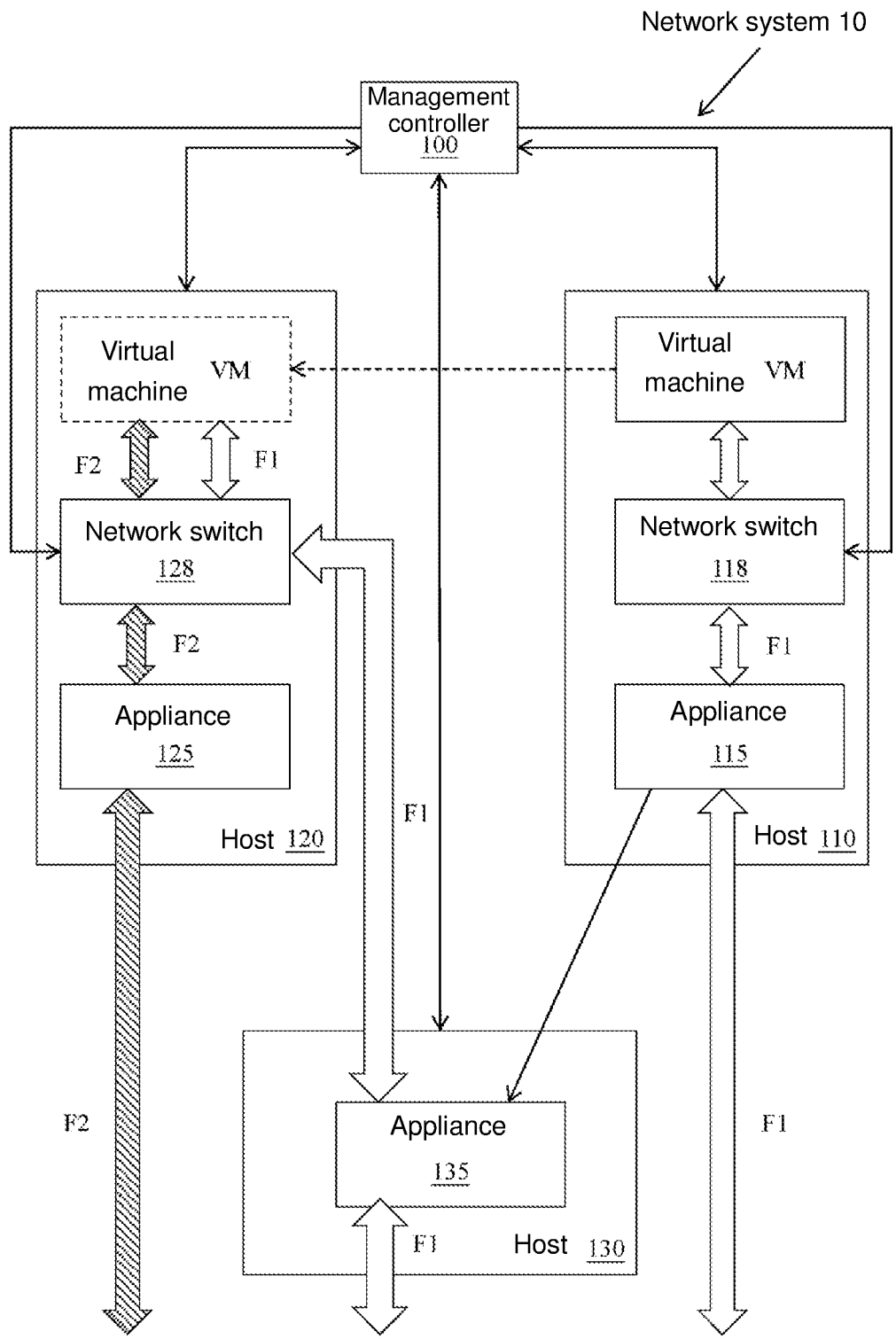
FIG. 1 shows a network system of an embodiment of the invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

As will be appreciated by one skilled in the art, the present embodiments may be embodied as a computer system/device, a method or a computer program product. Accordingly, the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present embodiments may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
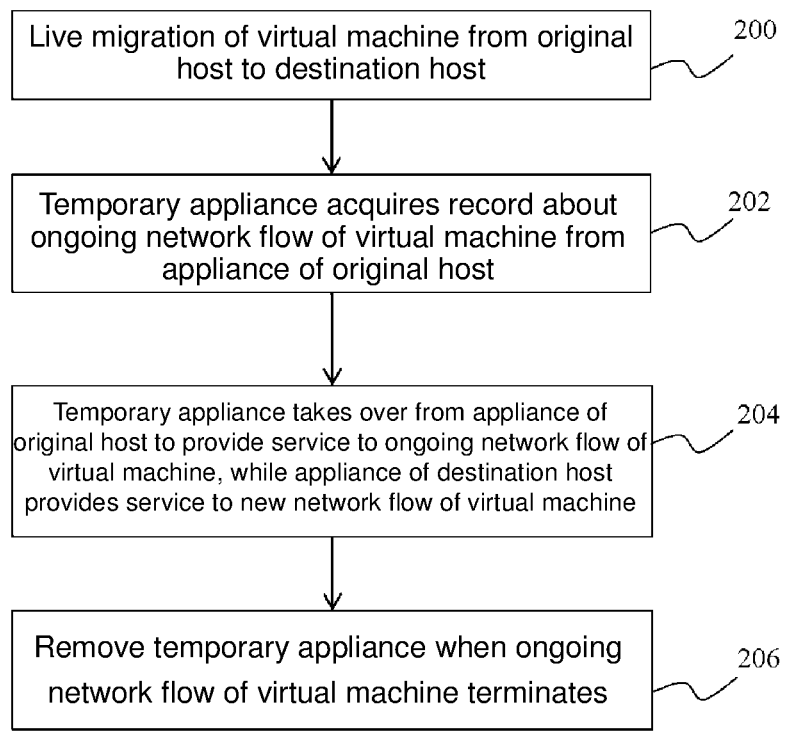
FIG. 2 shows a flowchart of a method of an embodiment of the invention.
Figure 3:
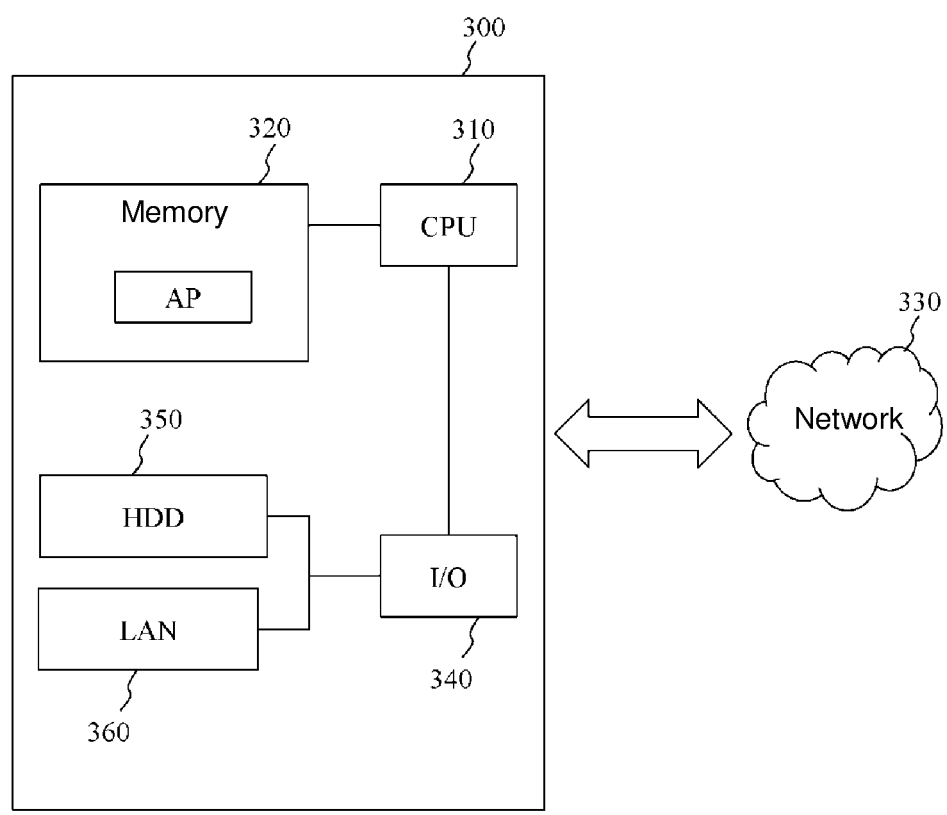
FIG. 3 shows a server of an embodiment of the invention.

Referring now to FIG. 1 through FIG. 3, computer systems/devices, methods, and computer program products are illustrated as structural or functional block diagrams or process flowcharts according to various embodiments. The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Architecture>

FIG. 1 shows a network system (10) of an embodiment. For simplification, FIG. 1 only shows a management controller (100), hosts (110) and (120), and a resource pool (130). In one embodiment, the network system (10) is located in substantially the same physical area, such as a server room, and the hosts or other devices of the network system (10) may connect to each other via local area network. However, in other embodiments, the hosts or other devices of the network system (100 may be distributed in different areas and are connected to each other via wide area Internet; under such a situation, communication between the hosts (110) and (120) may have to pass through a gateway or other network devices (both not shown), and the gateway may provide network address translation (NAT) function.

The hosts (110) and (120) each has other physical computing resources (not shown) such as processors, memories, etc., and the resource pool (130) may have one or multiple hosts or computing resources (also not shown) that are comparable with the hosts (110) and (120) and are preserved in advance. The hosts (110) and (120) and the resource pool (130) are connected with the management controller (100) for communication, and establish or handle one or multiple virtual machines or virtual appliances according to instructions of the management controller (100). VMware vCenter of VMware Company may serve as reference for details of the management controller (100) not directly involved with the present embodiments.

More particularly, in this embodiment, the network system (10) further includes appliances (115) and (125), as shown in the figure. The appliances (115) and (125) are disposed on the hosts (110) and (120) as virtual appliances to provide service to the virtual machines on the hosts (110) and (120), respectively. For virtual appliances, the technical document "Virtual Appliances: A New Paradigm for Software Delivery" by VMware may serve as reference. It should be noted that the present invention is not limited to virtual appliances.

In this embodiment, the appliances (115) and (125) are virtual intrusion prevention systems (IPS) for protecting the security of the virtual machines on the hosts (110) and (120). In other words, external network communications of each the virtual machines on the hosts (110) and (120) are all monitored by the appliances (115) and (125).

To provide external network communication of the virtual machine, as shown in FIG. 1, the hosts (110) and (120) further include virtual network switches (118) and (128), respectively, for providing network switching to the virtual machines or virtual appliances on the hosts. For virtual network switches on hosts, U.S. Pat. No. 7,643,482 or software-defined networking (SDN) switches in prior art may serve as reference.

In this embodiment, the management controller (100) also serves as a network controller to set the network switches (118) and (128) (such as flow tables; "OpenFlow Switch Specification" published by Open Networking Foundation may serve as reference). However, in other embodiments, an additional exclusive network controller (not shown) may be disposed to set the network switches (118) and (128), and does not necessarily have to be integrated with the management controller (100); SDN switches in prior art may serve as reference.

It should also be mentioned that, in this embodiment, in addition to each of the virtual machines or virtual appliances on each host of the network system (10) being able to communicate with each other via SDN, they may also communicate with other hosts via SDN. In other words, every unit in FIG. 1 may communicate with each other via SDN. In this aspect, the network system (10) may further require additional SDN switches and SDN controllers (not shown), yet this part is well known to those skilled in the related art and is not described in detail here.

<Method Flow>

The embodiments of the present invention shall be described with reference to the flow in FIG. 2 in accordance with the devices shown in FIG. 1. For illustrative purposes, it is assumed that the host (110) has a virtual machine VM having ongoing operations. The virtual machine VM is provided as a cloud web server and has a network flow F1 that is ongoing; Amazon Web Services (AWS) may be referred to for this aspect. The appliance (115) for the host (110) monitors the network flow F1 to determine whether there are malicious attacks against the virtual machine VM. The network flow F1 may include communications between the virtual machine VM and one or multiple IP addresses (such as different visitor devices). For further descriptions about network flows of the virtual machine VM, the aforementioned U.S. Pub. US2013/0275592 may serve as reference. In this embodiment, the appliance (115) establishes a corresponding connection table about the network flow F1 to record the state and other details of the network flow F1, and analyzes the information in the connection table to determine whether specific network events have occurred, and a count of the specific network events may be calculated. For the connection table and specific network events in the above, Security Network Protection of IBM Company, general IPS, or U.S. Pat. No. 7,827,272 may serve as reference.

Step (200): in this embodiment, the host (110) is required to be turned off for the purpose of maintenance, and thus the management controller (100) requires the live migration of the virtual machine VM to the host (120). The details of the live migration of the virtual machine VM from the host (110) to the host (120) are provided in prior art and are not described here.

Step (202): in this embodiment, the management controller (100) migrates the virtual appliance (115) on the host (110) to the resource pool (130) by cloning to become a virtual appliance (135). By directly cloning, the virtual appliance (135) is essentially the same as the virtual appliance (115), and thus the virtual appliance (135) shall have state information about the network flow F1 and the count of the specific network events from the virtual appliance (115). Due to the adoption of direct cloning, the aforementioned complicated issue involving information synchronization may be avoided.

In addition to migrating the entire virtual appliance to the resource pool (130) by direct cloning, in other embodiments, the management controller (100) may first require the resource pool (130) to establish the virtual appliance (135), and then the virtual appliance (115) provides a copy of the connection table of the network flow F1, the count of the specific network events, or other required records to the virtual appliance (135). Such an approach that only copies the information renders the virtual appliance (135) capable of receiving record copies from other appliances, which is particularly advantageous when virtual machines on multiple hosts are all migrating at the same time; by such an approach, the virtual appliance (135) may be utilized as a temporary appliance that takes over from multiple appliances instead of from only the appliance (115) (described in Step (204)). In addition, it may be understood that, such an approach may also be suitable for situations in which the appliance (115) and the appliance (135) are physical appliances.

Step (204): the management controller (100) serves as the network controller and modifies the settings of the virtual network switch (128) on the host (120) to redirect the network flow F1 of the virtual machine VM to the appliance (135), and requires the appliance (135) to take over from the appliance (115) to provide service to the network flow F1, i.e., to continue to monitor the network flow F1 to determine whether there are malicious attacks against the virtual machine VM (which has migrated to the host (120)). Since the appliance (135) has all records about the network flow F1 and the count of the specific network events of the appliance (115), i.e., the appliance (135) has the complete historical record about the network flow F1, errors when determining whether there are malicious attacks may be avoided.

On the other hand, a network flow F2 newly generated after the migration of the virtual machine VM to the host (120) is still directed to the appliance (125) for the host (120), and the appliance (125) monitors the network flow F2 to determine whether there are malicious attacks against the virtual machine VM on the host (120).

Step (206): when the network flow F1 terminates, the management controller (100) notifies the resource pool (130) to remove the appliance (135) to release hardware resources, or to provide the appliance (135) to other applications. In general, the network flow terminates when the communication ends; for example, when a packet includes a FIN flag, it means that the network flow represented by the packet terminates.

FIG. 3 further shows a hardware environment block diagram of a server (300) which may function as the management controller (100) in FIG. 1.

In one embodiment, the server (300) has a processor to execute dedicated application programs; a storage device to save various information and program codes; a communication and input/output device to act as an interface for users to communicate with; and peripheral devices or other specific usage devices. In other embodiments, the present invention may also be implemented with other forms and have more or less apparatuses or devices.

As shown in FIG. 3, the server (300) may have a processor (310), memory (320), and an input/output (I/O) unit (340). The I/O bus may be a high-speed serial bus such as a PCI-e bus, yet other bus architectures may also be used. Other connections to the I/O bus may be connected directly to the devices or through expansion cards. The I/O unit (340) may also be coupled to a hard disk (350) or a local area network (LAN) adaptor (360). By the LAN adaptor (360), the server (300) may communicate with other computer devices through a network (330). The network (330) may be implemented with any type of connection including static LAN connections or wide area network (WAN) connections or dialup networking by Internet service providers; the connection scheme is also not limited and may include wired or wireless connections such as communications with user computers by wireless networks of GSM or Wi-Fi. However, it should be understood that other hardware and software components (such as additional computer systems, routers, firewalls, etc.) may be included in the network despite not being shown in the figures. The memory (320) may be a random access memory (RAM), a read-only memory (ROM), or an erasable programmable read-only memory (EPROM or Flash memory). The memory (320) is used to save an operating system, program codes of a dedicated main program AP, and all kinds of information. The operating system is executed on the processor (310) and coordinates and provides control of various devices in the appliance (300); the processor (310) may access the memory (320) to execute the main program AP to implement the management controller (100) in FIG. 1 or carry out the steps of the method shown in FIG. 2.

Those skilled in the art may understand that the hardware of the server (300) in FIG. 3 may have various modifications according to different embodiments. Other internal hardware or peripheral devices such as Flash ROM, equivalent non-volatile memory, optical drive, etc. may be added to or replace the hardware shown in FIG. 3.

Moreover, the hardware of the server (300) in FIG. 3 could be adopted by the host (110), the host (120), or hosts in the resource pool (130).

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims instead of the above description. All equivalent meanings and scope which fall within the appended claims must be deemed falling within the scope of the appended claims.

What is claimed is:

1. A method applied to a processor in communication with memory, the method comprising:
    configuring a network system including a first host having a first appliance and a second host having a second appliance;
    at least one virtual machine being disposed on the first host and having a first network flow, and the first appliance generating state information about the first network flow, the state information including history and context information of the at least one virtual machine;
    performing a live migration of the at least one virtual machine from the first host to the second host;
    during the live migration, directly cloning the first appliance to a resource pool, the cloned first appliance becoming a temporary third appliance, the temporary third appliance being independent of the first and second hosts;
    obtaining, without interruption, by the temporary third appliance, a copy of the state information about the first network flow comprising monitoring the first network flow for a malicious attack against the migrated virtual machine;
    utilizing the state information to re-direct, by the temporary third appliance, operations of the first network flow; and
    removing the temporary third appliance from the resource pool upon termination of the first network flow.

2. The method as claimed in claim 1, wherein the state information about the first network flow includes a count of specific network events.

3. The method as claimed in claim 1, further comprising: controlling the second appliance to provide service to a second network flow of the at least one virtual machine occurring after the migration of the at least one virtual machine to the second host.

4. The method of claim 1, wherein the temporary third appliance functions as a temporary appliance for two or more appliances.

5. The method of claim 1, wherein removing the temporary third appliance includes releasing one or more hardware resources.

6. The method of claim 1, wherein removing the temporary third appliance includes providing the temporary third appliance to another application.

7. The method of claim 1, wherein directly cloning the first appliance comprises synchronizing the state information between the first appliance and the second appliance.

8. A system comprising:
    a processor in communication with memory;
    a module in communication with the processor, the module comprising:
    a hardware management controller, disposed in a network system including a first host having a first appliance and a second host having a second appliance;
    a virtual machine disposed on the first host and having a first network flow, and the first appliance generates state information about the first network flow, the state information including history and context information of the virtual machine;
    the management controller to manage live migration of the virtual machine including the management controller to:
        perform a live migration of the virtual machine from the first host to the second host;
        during the live migration, directly clone the first appliance to a resource pool, the cloned first appliance becoming a temporary third appliance, the temporary third appliance being independent of the first and second hosts;
        obtain, without interruption, by the temporary third appliance, a copy of the state information about the first network flow comprising monitoring the first network flow for a malicious attack against the migrated virtual machine;
        utilize the state information to take over, by the temporary third appliance, operations of the first network flow; and
        remove the temporary third appliance from the resource pool upon termination of the first network flow.

9. The network system as claimed in claim 8, wherein the first appliance is disposed on the first host as a virtual appliance.

10. The network system as claimed in claim 8, wherein the second appliance is disposed on the second host as a virtual appliance.

11. The network system as claimed in claim 8, further comprising the temporary third appliance to monitor the first network flow for a malicious attack against the migrated virtual machine.

12. The network system as claimed in claim 8, wherein the temporary third appliance contains a complete historical record of the first network flow, the record including a count of network events.

13. The network system as claimed in claim 8, wherein the second network flow is directed to the first appliance.

14. The network system as claimed in claim 13, further comprising the first appliance to monitor the second network flow.

* * * * *